United States Patent [19]

Chiba et al.

[11] Patent Number: 5,512,364
[45] Date of Patent: Apr. 30, 1996

[54] MAGNETO-OPTICAL RECORDING MEDIUM

[75] Inventors: Kiyoshi Chiba, Chofu; Tetsuo Sato, Hino; Masahiko Sekiya, Hino; Kazutomi Suzuki, Hino, all of Japan

[73] Assignee: Teijin Limited, Osaka, Japan

[21] Appl. No.: 203,708

[22] Filed: Feb. 28, 1994

Related U.S. Application Data

[63] Continuation of Ser. No. 795,222, Nov. 15, 1991, abandoned, which is a continuation of Ser. No. 659,536, Feb. 22, 1991, abandoned, which is a continuation of Ser. No. 246,907, Sep. 16, 1988, abandoned, which is a continuation of Ser. No. 50,527, May 13, 1987, abandoned.

[30] Foreign Application Priority Data

May 14, 1986 [JP] Japan .................................. 61-108663
Dec. 26, 1986 [JP] Japan .................................. 61-308520

[51] Int. Cl.$^6$ .............................. B32B 5/16; G11B 5/66; G11B 5/74; G11C 13/06
[52] U.S. Cl. .................. 428/332; 428/336; 428/694 ML; 428/694 DE; 428/694 XS; 428/694 ST; 428/694 SL 469; 428/472; 428/900; 428/928; 346/135.1; 346/962; 360/131; 360/134; 360/135; 365/122; 369/13; 369/288
[58] Field of Search ..................... 428/694 DE, 694 XS, 428/469, 472, 928, 900, 694 ML, 964 ST, 694 SL, 332, 336; 365/122; 360/131, 134, 135; 369/13, 288; 346/135.1, 96 L

[56] References Cited

U.S. PATENT DOCUMENTS

| | | | |
|---|---|---|---|
| 4,164,604 | 8/1979 | Tamai | 428/409 |
| 4,441,138 | 5/1984 | Ando | 346/135.1 |
| 4,449,138 | 5/1984 | Ando | 346/135.1 |
| 4,461,807 | 7/1984 | Mori et al. | 428/469 |
| 4,548,864 | 10/1985 | Nakayama | 428/336 |
| 4,579,777 | 4/1986 | Honguu | 428/336 |
| 4,680,742 | 7/1987 | Yamada et al. | 369/13 |
| 4,695,510 | 9/1987 | Sawamura | 428/336 |
| 4,751,124 | 6/1988 | Matsuzawa | 428/65.1 |

FOREIGN PATENT DOCUMENTS

| | | | |
|---|---|---|---|
| 111988 | 6/1984 | European Pat. Off. | |
| 52-31703 | 3/1977 | Japan | G11B 5/64 |
| 56-126907 | 10/1981 | Japan | H01F 10/12 |
| 58-73746 | 6/1983 | Japan | C22C 38/10 |
| 215744 | 12/1983 | Japan . | |
| 59-10052 | 6/1984 | Japan | G11B 7/24 |
| 197965 | 10/1985 | Japan . | |
| 197966 | 10/1985 | Japan . | |
| 243844 | 12/1985 | Japan . | |
| 243842 | 12/1985 | Japan . | |
| 122955 | 6/1986 | Japan . | |
| 61-65846 | 7/1986 | Japan | G11B 11/10 |
| 89255 | 4/1987 | Japan . | |
| 2164269 | 3/1986 | United Kingdom . | |

OTHER PUBLICATIONS

Patent Abstracts of Japan; vol. 10, No. 173 (P. 469) [2229] Jun. 18, 1986.

*Primary Examiner*—Leszek Kiliman
*Attorney, Agent, or Firm*—Burgess, Ryan & Wayne

[57] ABSTRACT

In the magneto-optical recording medium with a transparent substrate, a film of dielectric indium oxide, tin oxide or metallic Ti is interposed between the substrate and the recording layer, to prevent deterioration of the properties thereof.

5 Claims, 2 Drawing Sheets

MAGNETO-OPTICAL RECORDING MEDIUM

This application is a continuation of application Ser. No. 795,222, filed Nov. 15, 1991, now abandoned, which application is a continuation of application Ser. No. 659,536 filed Feb. 22, 1991 which is a continuation of U.S. Pat. No. 246,907, filed Sep. 16, 1988 which is a continuation of U.S. Pat. No. 050,527, filed Aug. 13, 1987 now abandoned.

BACKGROUND OF THE INVENTION

1. Field of the Invention

The present invention relates to a magneto-optical recording medium, in which the information can be written, reproduced, and erased by light, such as a laser or the like. More particularly, the present invention relates to an improvement in the environmental resistance of a magneto-optical recording medium, which comprises a transparent substrate made of synthesized organic resin as well as a recording layer formed thereon and having an easy axis of magnetization perpendicular to the film plane, and which is used for the magneto-optical recording and reproduction of information by the magneto-optical effect.

2. Description of the Related Art

Various studies are underway of optical recording media, since it features a high density- and high capacity-recording of information. Also, as the magneto-optical recording material is erasable, it is used for broad field of applications, and various related materials and systems have been disclosed. Actual utilization of the magneto-optical recording has been desired.

Various magneto-optical materials have been proposed, such as FeTb in Japanese Unexamined Patent Publication No. 52-31,703, FeTbGd in Japanese Unexamined Patent Publication No. 56-126,907, FeTbCo and FeCoDy in Japanese Unexamined Patent Publication No. 58-73,746, and FeNd in Japanese Unexamined Patent Publication No. 61-165,846. To be able to realize an actual utilization of these materials for erasable magnetooptical recording, it is desirable that the recording and reproducing characteristics thereof be further improved, and further, the durability thereof, including the oxidation-resistance be improved, in view of the probability of corrosion, such as oxidation and the like, of the majority of the above constituent materials of the recording layer.

Japanese Unexamined Patent Publication No. 59-110,052 proposes, in line with the above necessity for improvements, to prevent the recording layer from oxidation by sandwiching the recording layer of an optical recording element between two, oxygen-free films, at least one of which is a dielectric layer. Note, it is widely known to enhance the Kerr rotation angle by interposing a dielectric layer between the substrate and the recording layer. The dielectric layer must be free of oxygen and preferably is a nitride and fluoride, such as AlN, $MgF_2$, ZnS, $CeF_3$, $AlF_3 \cdot 3NaF$, $Si_3N_4$, and the like. Among these, the nitride layer is considered to have an excellent resistance against environmental effects.

The present inventors investigated the nitride films of AlN, $Si_3N_4$, and the like, which are considered to exhibit excellent environmental resistance among the dielectric materials, and discovered the existence of a slow film formation speed and a great strain in the film, which gave rise, particularly when depositing a multi-layer film on a plastic substrate, to a problem of peeling along grooves formed for the age resistance test. The peeling occurs because of an insufficient durability, which should be distinguished from the oxidation resistance.

SUMMARY OF THE INVENTION

In view of the background described above, it is therefore a general object of the present invention to provide a magneto-optical recording medium having an improved durability and which comprises a transparent substrate made of organic resin, a recording layer, and a dielectric layer interposed between the substrate and the recording layer.

The first specific object of the present invention is to provide the above mentioned recording medium with an environmental stability, particularly a resistance against deterioration at the interface between the substrate and dielectric layer, thereby preventing cracks and peeling.

A second specific object of the present invention is to stabilize the interface between the dielectric layer and magneto-optical alloy layer.

A third specific object of the present invention is to alleviate degradation due to an intrusion of degrading materials, particularly $H_2O$ and the like, from or through a plastic substrate to the interface of a magneto-optical recording layer.

In accordance with the objects of present invention, there is provided a magneto-optical recording medium comprising a transparent substrate made of synthesized resin, a magneto-optical recording layer, and a dielectric layer interposed between the magneto-optical recording layer and transparent substrate, and optionally, a protecting layer, characterized in that the dielectric layers consists of a dielectric transparent oxide film containing at least one element selected from the group consisting of In and Sn. This recording medium is hereinafter referred to as the In/Sn-oxide recording medium.

In the In/Sn-oxide-recording medium, the dielectric layer consisting of dielectric transparent oxide is formed by physical vapor deposition. Preferably, in the In/Sn-oxide recording medium, a protecting layer consisting of a metallic titanium film is provided between the oxide film and the magneto-optical film (this medium is hereinafter referred to as the In/Sn-oxide/Ti recording medium), since the resistances against oxidation and humidity are enhanced by the titanium film. The titanium film has a thickness of preferably 50 Å or less, more preferably 20 Å or less, in view of the recording and reproducing properties.

Also in accordance with the objects of present invention, there is provided a magneto-optical recording medium comprising a transparent substrate made of synthesized resin, and a magneto-optical recording layer, and optionally, a dielectric layer interposed between the magneto-optical recording layer and transparent substrate, characterized in that at least one surface of the magneto-optical recording layer toward the substrate is coated with a protecting layer consisting of Ti. This recording medium is hereinafter referred to as the Ti recording medium.

The present invention is described in more detail with reference to the drawings.

DESCRIPTION OF THE PREFERRED EMBODIMENTS

Figure 1A:
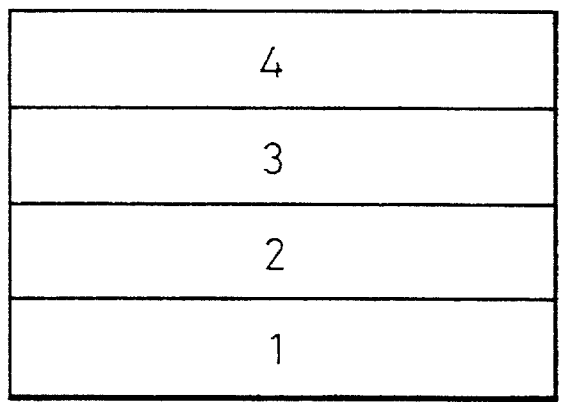
FIGS. 1(A) and 1(B) show the layer structure and a top plan view of the recording media according to Examples 1, 3, and Comparative Examples 1,3.

The dielectric layer consisting of dielectric transparent oxide film may be any material provided that it contains In and/or Sn and is dielectric. However, in view of the recording characteristics, the dielectric layer is preferably highly oxidized to form a stoichiometric oxide, and thus to provide an electric resistance as high as a volume resistivity of $1 \times 10^{-1}$ $\Omega \cdot$cm or more. Such oxide is indium oxide ($In_2O_3$) and/or tin oxide (SnOx) having a high oxygen concentration and a low concentration of carriers (electrons) due to defects and the like. The $In_2O_3$ and/or SnOx may contain impurities such as Ta, Sb, F, and the like therein. However, $In_2O_3$ and/or $SnO_2$ films free of impurities are most preferable because of their greater reflectivity, which is an important property for the optical interference-layer of magneto-optics. The oxide film consisting of $In_2O_3$ or consisting mainly of $In_2O_3$ and containing a small amount of Sn oxide is preferred in the light of durability and low laser power for reading the information. The content of Sn oxide can be 30% by weight or less, and 7% by weight or less.

The $In_2O_3$ and/or SnOx layers can be formed by the vacuum evaporation method and the sputtering method, which are known per se. The sputtering method is preferred, because it provides a condition such that the adhesion with a plastic substrate is sufficiently high that peeling will not occur in an environmental test under a high temperature- and high humidity-condition.

The dielectric transparent film containing In as the constituent member of the dielectric layer according to the present invention, does not include the indium oxide film known as the transparent conductive film, because this film has a volume resistivity in the range of from $10^{-2}$ to $10^{-4}$ $\Omega \cdot$cm, and thus is electrically conductive. This film contains the metallic In and has an excellent heat conductivity, with the result that, when used in contact with the recording layer and the recording layer is irradiated with a laser light spot, a heat dissipation from the recording layer to the transparent electrode occurs. This, in turn, makes it necessary to strengthen the laser power, and leads to a decrease in the S/N ratio due to distortion of the bit shape. Furthermore, an electrochemical current flows between an Fe-base alloy and a conductive oxide film at a high humidity environment. It accelerates the environmental degradation of a magneto-optical disc. Accordingly, the conductive oxide film containing In is inappropriate for application in the magneto-optical recording medium. In addition, the oxide film containing metallic In and having the resistivity of $10^{-4}$ $\Omega \cdot$cm has a high carrier concentration and exhibits a reflection loss when irradiated with near infrared radiation, due to plasma oscillation. Furthermore, to form a transparent conductive film by using an oxide film containing In on the transparent plastic substrate made of polycarbonate, acrylic resin and the like, the substrate usually must be heated to a temperature of approximately 100° C. and, therefore, the grooves on the surface of the plastic substrate are deformed due to the thermal factor to an extent that it is difficult to attain an excellent medium. Therefore, the transparent conductive film cannot be used in the present invention, for the reasons described above.

In the In/Sn oxide recording medium, the transparent oxide film may consist of either indium or tin oxide. It may also consists both of indium and tin oxides.

In the In/Sn-oxide recording medium, the tin oxide layer may be any tin-containing oxide, provided that it is dielectric. Preferably, the tin oxide is SnOx, with $1 \leq x \leq 2$, since it exhibits a small absorption of the laser light used for recording and regenerating. The refractive index of the dielectric layer containing In and/or Sn must be more than 1.7 for reading-out laser wavelength, and is preferably more than 1.9 so as to obtain adequate enhancement of the Kerr rotation angle.

The effects of the In and/or Sn-containing oxide are now described in comparison with the prior art. In the prior art, in which a dielectric film is interposed between the transparent plastic substrate of a recording disc and the magneto-optical recording layer, to enhance the Kerr rotational angle due to reflection from the film surface, the insulating film represented by films of SiO, ZnS, AlN, $Si_3N_4$ and the like is used. When such a disc is subjected to a durability test under a high temperature- and high humidity-condition, or by heat cycles, the disc will crack, thereby drastically impairing the magneto-optical properties. This is attributable, according to researches by the present inventors, mainly to the peeling of the dielectric layer at the interface thereof with the plastic substrate. Surprisingly, however, peeling of the In and/or Sn containing oxide layer does not occur due to deterioration at the interface thereof with the substrate, thereby considerably improving the durability, particularly against heat cycles and heat shock. This improvement seems to be a result of a high affinity of the In and/or Sn-containing oxide with the plastic substrate, particularly the polycarbonate substrate.

The titanium contained in the protecting layer of the Ti recording medium and the In/Sn-oxide/Ti recording medium, is now described.

Any adsorbed oxygen present on the surface of the dielectric layer will react with titanium, thereby preventing the degradation of the recording layer due to oxygen intrusion. Since the coefficient of thermal expansion of titanium is an intermediate value between that of dielectrics and the Fe-based alloy of recording layer, the stress which is induced due to thermal shock at the interfaces can be reduced, thereby stabilizing the recording medium. The titanium of the protecting layer may be oxidized, but even in this case, the refractive index, which is originally 1.8 or more, exhibits little change. The titanium may be alloyed, provided that the above described small dependence of refractive index upon oxidation is not impaired. The titanium protecting layer preferably has a thickness of 50 Å or less, since the light absorption in the layer is 20% or less and small. A thickness of the titanium protecting layer of 20 Å or less is more preferable, since the light absorption thereof is 5% or less.

The recording media according to the present invention, i.e., the In/Sn-oxide recording medium, the In/Sn-oxide/Ti recording medium, and the Ti recording medium, are now described with regard to the magneto-optical layer, the synthetic resin- or plastic-substrate, the layer protecting a magneto-optical recording layer on the side thereof opposite to the substrate.

The magneto-optical recording layer according to the present invention may be made of any thin film of magnetic metal, provided that information can be written therein or reproduced therefrom by the magneto-optical effect. For example, the thin film of magnetic metal may have an axis of easy magnetization perpendicular to the film surface and form any inverse magnetic domains, such as FeTb series alloys, e.g., FeTbCo alloy, FeTbGd alloy, and FeNd alloy, FeNd series alloys, e.g., FeCoDyNd, FeCoDyNdTi, FePr series alloys, FeSm series alloy, and FeCe series alloys.

The synthetic resin substrate according to the present invention may be made of polycarbonate resin, acrylic resin, epoxy resin, and 4-methylpentene resin, as well as copolymers thereof. The polycarbonate resin is preferred in view of the mechanical properties, weathering qualities, heat resistance and vapor-permeable amount thereof.

In the present invention, a protecting layer consisting of dielectrics or metal may be provided on the magneto-optical recording layer on the side thereof opposite to the substrate. Since the adhesion property of the protective layer with the substrate is of no importance, nitrides, e.g., AlN, AlSiN, and $Si_3N_4$, fluorides, e.g., $MgF_2$, ZnS, $CeF_3$, and $AlF_3.3NaF$, and oxides: e.g., SiO, $SiO_2$, AlSiO, and $TiO_2$, can be used for the protecting layer. As the metal, Ti or Zr is preferable because of the low heat conductivity thereof.

The present invention is now described in more detail by way of examples, with reference to the drawings.

EXAMPLE 1

(Dielectric $In_2O_3$)

Figure 1B:
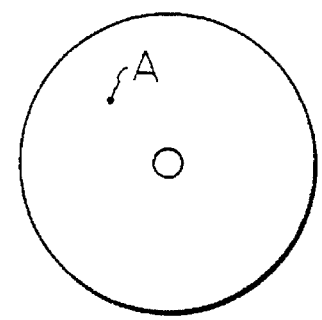

A substrate in the form of a disc having a diameter of 200 mm, a thickness of 1.2 mm and having grooves at a pitch of 2.5 µm, was made of acrylic resin (PMMA). The substrate is denoted by 1 in FIG. 1.

The substrate 1 was fixed in the vacuum chamber of a high frequency magnetron sputtering device with three targets (SPF-430 type produced by ANELVA Co., Ltd.). The vacuum chamber was evacuated to a pressure of $4 \times 10^{-7}$ Torr or less, and the substrate 1 was rotated at 15 rpm and water-cooled while the sputtering was carried out.

Subsequently, a gaseous mixture of Ar and $O_2$ (20 vol %) was admitted into the vacuum chamber and the flow rate thereof was adjusted to provide a pressure of $1\times10^{-2}$ Torr. The target of the magnetron sputtering device for the indium oxide deposition was an In (indium) disc having a diameter of 100 mm and a thickness of 5 mm. A radio frequency reactive sputtering was carried out at a discharge power of 100 W and a discharge frequency of 13.56 MHz. As a result, an $In_2O_3$ film was deposited as the dielectric layer 2 having a thickness of approximately 800 Å. Subsequently, the target to be sputtered was replaced with the target for depositing the recording layer, i.e., the $Fe_{69}Tb_{23}Co_8$ alloy target (number indicates the composition by atomic %), and argon gas (5N) was then admitted into the vacuum chamber. The FeTbCo alloy film was deposited under the same discharge conditions as above to a thickness of approximately 1000 Å.

Finally, as the protecting layer 4, the $In_2O_3$ film was deposited in the same way as the dielectric layer 2, to a thickness of approximately 800 Å.

By the procedure as described above a magneto-optical recording medium having a layer structure of PMMA/$In_2O_3$/TbFeCo/$In_2O_3$ was obtained. The circumferential part at a point A (FIG. 1(B)) was observed by an optical microscope, and neither defects nor peeling were revealed.

The layer structure as described above was allowed to stand in a constant-temperature and humidity condition of 60° C. and an RH of 90% for 1000 hours. Subsequently, the circumferential part at the point A was observed by an optical microscope, and neither defects nor peeling were revealed, thus showing no change from the condition before standing.

The discrete film of $In_2O_3$ was prepared under the same conditions as above, and the electric resistance thereof was measured. The measurement revealed the film to be an insulating film having surface resistance of 10 MΩ/sq or more and a volume resistivity of $8\times10$ Ω·cm or more. Further, a refractive index was measured by an ellipsometer (Mizoziri Co., Ltd). The measurement revealed the film to be a high refractive film having an index of refractive of 2.1 at 830 mm wave length.

Comparative Example 1 (SiN)

A substrate in the form of a disc having a diameter of 200 mm and a thickness of 1.2 mm and having grooves at a pitch of 2.5 µm, was made of acrylic resin (PMMA).

The substrate 1 was fixed in the vacuum chamber of a high frequency magnetron sputtering device with three targets (SPF-430 type produced by ANELVA Co., Ltd.). The vacuum chamber was evacuated to a pressure of $4 \times 10^{-7}$ Torr or less, and the substrate 1 was rotated at 15 rpm and water-cooled while the sputtering was carried out.

Subsequently, a gaseous mixture of Ar and $N_2$ (50 vol %) was admitted into the vacuum chamber and the flow rate thereof was adjusted to provide a pressure of $1\times10^{-2}$ Torr. The target of the magnetron sputtering device for the dielectrics-deposition was an Si disc having a diameter of 100 mm and a thickness of 5 mm. A radio frequency reactive sputtering was carried out at a discharge power of 100 W and a discharge frequency of 13.56 MHz. As a result, an SiN film was deposited as the dielectric layer 2 having a thickness of approximately 800 Å. Subsequently, the target to be sputtered was replaced with the target for depositing the recording layer, i.e., the $Fe_{69}Tb_{23}Co_8$ alloy target. The FeTbCo alloy film was deposited under the same discharge conditions as above to a thickness of approximately 1000 Å.

Finally, as the protecting layer 4, the SiN film was deposited, in the same way as the dielectric layer 2, to a thickness of approximately 800 Å.

By the procedure as described above a magnetooptical recording medium having a layer structure of PMMA/SiN/TbFeCo/SiN was obtained. The circumferential part at a point A (FIG. 1(B)) was observed by an optical microscope, and neither defects nor peeling were revealed.

The layer structure as described above was allowed to stand in a constant-temperature and humidity condition of 60° C. and an RH of 90% for 90 hours. Subsequently, the circumferential part at point A was observed by an optical microscope, which revealed peeling along the grooves. The peeled parts were subjected to a surface analysis of the elements by means of an X-ray microprobe analysis (XMA), which revealed peeling of the dielectric layer 2. The superiority of the present invention is demonstrated by Example 1 and Comparative Example 1.

Example 2 (Dielectric $In_2O_3$ and Protecting Ti)

A substrate in the form of a disc having a diameter of 200 mm and a thickness of 1.2 mm and having grooves at the pitch of 1.6 µm, was made of polycarbonate resin (PC).

Figure 2:
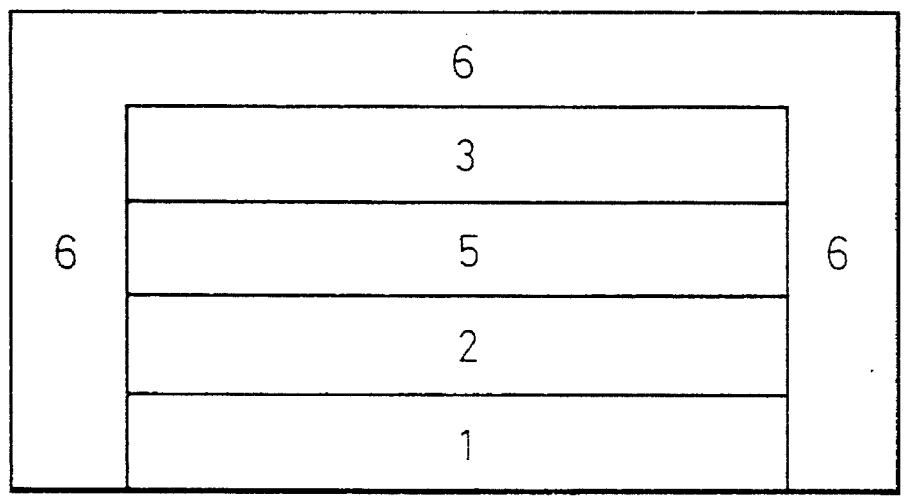
FIG. 2 illustrates the layer structure of the recording medium of Example 2.
Figure 3:
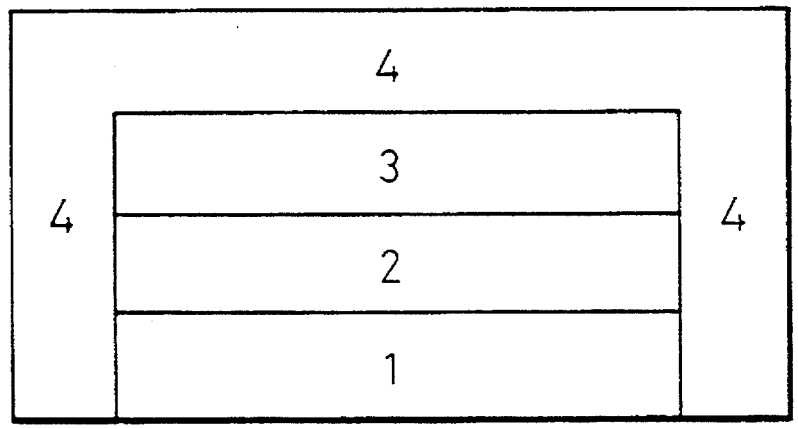
FIG. 3 illustrates the layer structure of the recording medium of Comparative Example 2; and, FIG. 4A and FIG. 4B illustrate the layer structure of the recording medium according to Example 4 and Comparative Example 4.

The substrate 1 (FIG. 2) was fixed in the vacuum chamber of a radio frequency magnetron sputtering device with three targets (SPF-430 type produced by Anerva Co., Ltd.). The vacuum chamber was evacuated to a pressure of $4\times10^{-7}$ Torr or less. The substrate 1 was rotated at 15 rpm and water-cooled while the sputtering was carried out.

Subsequently, the gaseous mixture of Ar and $O_2$ (10 vol %) was admitted into the vacuum chamber and the flow rate thereof was adjusted to provide a pressure of $1\times10^{-2}$ Torr.

The target of the magnetron sputtering device for the indium oxide deposition was an $In_2O_3$ sintered body having a diameter of 100 mm and a thickness of 5 mm. The high frequency reactive sputtering was carried out at a discharge power of 100 W and a discharge frequency of 13.56 MHz. As a result, an $In_2O_3$ film was deposited as the dielectric layer 2 to a thickness of approximately 800 Å. Subsequently, the target to be sputtered was replaced with the target for depositing the first protecting layer 5, i.e., the Ti layer, and then the Ar gas (5N) was admitted into the vacuum chamber. The Ti film 5 was deposited under the same discharge conditions as above, to a thickness of approximately 10 Å. The target to be sputtered was then replaced with the target for depositing the recording layer, i.e., $Fe_{69}Tb_{23}Co_8$ alloy target, and then the argon gas (5N) was admitted into the vacuum chamber. The FeTbCo alloy film was deposited under the same discharge conditions as above, to a thickness of approximately 1000 Å. Note, the substrate having a diameter of 200 mm was masked so that the above respective, $In_2O_3$ film, Ti film and FeTbCo alloy film were deposited on the substrate from the center to a radius of 90 mm. The mask was finally removed to enable a film to be deposited on the entire surface of substrate. The target to be sputtered was then replaced with the Ti target for forming the second protecting layer 6. The Ti film was deposited under the same conditions as described above to a thickness of approximately 200 Å.

By the procedure as described above, the magneto-optical (In/Sn-oxide/Ti) recording medium having a layer structure of $PC/In_2O_3/Ti/FeTbCo/Ti$ was obtained. In this medium, the second protecting layer 6 covers all of the layers, including the recording layer 3.

The C/N ratio (carrier to noise ratio) (=S/N+ 10 log (frequency band width/resolution band width) of the layer structure was measured. In this measurement, a magneto-optical recording and reproducing unit (OMS-1000 Type (III) by Nakamichi) was used. The disc was rotated at 900 rpm, and signal of 1.024 MHz was recorded in the disc by means of a laser diode light of 5.0 mW. The signal was then read out by means of a laser diode light of 0.8 mW. The applied magnetic field was 500 Öe. The result is given in Table 1 as "Example 2".

The layer structure as described above was allowed to stand in a constant-temperature and humidity condition of 60° C. and an RH of 90% for 1000 hours. Subsequently, the C/N ratio was measured. The result is given in Table 1 as "Example 2".

The discrete film of $In_2O_3$ was prepared under the same conditions above and the electric resistance thereof was measured. The measurement revealed the film to be an insulating film having a surface resistance of 10 MΩ/sq or more and a volume resistivity of $8\times10$ Ω·cm or more.

Comparative Example 2

A substrate in the form of a disc having a diameter of 200 mm, a thickness of 1.2 mm and having grooves at the pitch of 1.6 μm was made of polycarbonate resin (PC).

The substrate 1 (FIG. 2) was fixed in the vacuum chamber of a radio frequency magnetron sputtering apparatus with three targets (SPF-430 type produced by ANELVA Co., Ltd.). The vacuum chamber was evacuated to a pressure of $4\times10^{-7}$ Torr or less. The substrate 1 was rotated at 15 rpm and water-cooled while the sputtering was carried out.

Subsequently, Ar gas (5N) was admitted into the vacuum chamber and flow rate thereof was adjusted to provide a pressure of $1\times10^{-2}$ Torr. The target of the magnetron sputtering device for the dielectrics-deposition was a ZnS disc having a diameter of 100 mm and a thickness of 5 mm. The radio frequency reactive sputtering was carried out at a discharge power of 100 W and a discharge frequency of 13.56 MHz. As a result, a ZnS film was deposited as the dielectric layer 2, to a thickness of approximately 800 Å. Subsequently, the target to be sputtered was replaced with the target for depositing the recording layer, i.e., the $Fe_{69}Tb_{23}Co_8$ alloy target, and then the FeTbCo alloy film was deposited under the same discharge conditions as above, to a thickness of approximately 1000 Å.

The target to be sputtered was then replaced with the ZnS target for forming the protecting layer 4. The ZnS film was deposited under the same conditions as described above, to a thickness of approximately 800 Å.

By the procedure as described above the magnetooptical recording medium having a layer structure of PC/ZnS/FeTbCo/ZnS was obtained. The C/N ratio of this layer structure was measured as in Example 2. The result is shown in Table 1 as "Comparative Example 2".

The layer structure as described above was allowed to stand in a constant-temperature and humidity condition of 60° C. and an RH of 90% for 500 hours. The C/N ratio was then measured, and an observation of the disc revealed a number of cracks on the surface of recording medium. The results are shown in Table 1 as "Comparative Example 2".

TABLE 1

| | C/N ratio | |
| --- | --- | --- |
| | Before Standing | After Standing |
| Example 2 | 51 dB | 51 dB |
| Comparative Example 2 | 51 dB | 44 dB |

As apparent from Table 1, the C/N ratio does not change even after standing for 500 hours, but the C/N ratio decreases from 51 dB to 44 dB in Comparative Example 2.

No change in the appearance occurred in Example 2, but wrinkles, presumably due to corrosion deterioration, were numerous in Comparative Example 2.

Comparative Example 3

The procedure of Example 2 for producing a recording disc was repeated except that: the substrate temperature was raised to 100° C.; the target was made of a sintered body of $In_2O_3$ (5 wt % $SnO_2$); and the sputtering gas was pure Ar gas (5N). The obtained $In_2O_3$ ($SnO_2$) film was transparent and conductive, and had a surface resistance of 500 Ω/sq and a volume resistivity of $4\times10^{-3}$ Ω·cm. The obtained disc was rotated at 900 rpm and a signal of 1,024 MHz was recorded by means of semiconductor laser light of 5 mW. The reproducing was then carried out by means of a laser diode light of 0.8 mW, and the resulting C/N ratio was 44 dB. The power of the laser light for writing was increased to 8.5 mW, and then an C/N ratio of 49 dB was obtained. As is apparent from Comparative Example 3, the conductive transparent $In_2O_3$ ($SnO_2$) film, known as the ITO electrode, is disadvantageous in that it produces an energy loss of the laser when writing.

EXAMPLE 3

A substrate in the form of a disc having a diameter of 200 mm, a thickness of 1.2 mm and having grooves at the pitch of 1.6 μm, was made of polycarbonate resin (PC). The substrate 1 (FIG. 2) was fixed in the vacuum chamber of a radio frequency magnetron sputtering device with three targets (SPF-430 type produced by ANELVA Co., Ltd.). The vacuum chamber was evacuated to a pressure of $4\times10^{-7}$ Torr or less. The substrate 1 was rotated at 15 rpm and water-cooled while the sputtering was carried out.

Subsequently, a gaseous mixture of Ar and $O_2$ (20 vol %) was admitted into the vacuum chamber and the flow rate thereof was adjusted to provide a pressure of $2\times10^{-2}$ Torr. The target of the magnetron sputtering device for the tin oxide deposition was a $SnO_2$ sintered disc having a diameter of 100 mm and a thickness of 5 mm. A high frequency reactive sputtering was carried out at a discharge power of 50 W and a discharge frequency of 13.56 MHz. As a result, an $SnO_2$ film was deposited as the dielectric layer 2, to a thickness of approximately 800 Å. Subsequently, the target to be sputtered was replaced with the target for depositing the first protecting layer 5, i.e., a Ti target, and then the argon gas (5N) was admitted into the vacuum chamber. The Ti film was deposited under the same discharge conditions as above, to a thickness of approximately 10 Å.

The target to be sputtered was then replaced with the TbFeCo composite target, and then the Ar gas (5N) was admitted into the vacuum chamber.

The FeTbCo alloy film was deposited under the same discharge conditions as above, to a thickness of approximately 1000 Å.

The target to be sputtered was then replaced with a Ti target for depositing the second protecting layer 6, and the Ti film was deposited under the same discharge conditions as above, to a thickness of approximately 200 Å.

By the procedure as described above, the magnetooptical (In/Sn-oxide/Ti) recording medium having a layer structure of PC/SnOx/Ti/Fe TbCo/Ti was obtained. In this medium, the second protecting layer 6 covers all of the layers, including the recording layer 3.

The C/N ratio (=S/N+10 log (frequency band width/ resolution band width) of the layer structure was measured. In this measurement, a magneto-optical recording and reproducing unit (OMS-1000 Type (III) by Nakamichi) was used. The disc was rotated at 900 rpm, and a signal of 1.024 MHz was recorded in the disc by means of a laser diode light of 7.5 mW. The signal was then read out by means of a laser diode light of 0.8 mW. The applied magnetic field was 500 Oe. The result is given in Table 2 as "Example 3".

The layer structure as described above was allowed to stand in a constant-temperature and humidity condition of 60° C. and an RH of 90% for 500 hours. Subsequently, the C/N ratio was measured. The result is given in Table 2 as "Example 3".

The discrete film of $SnO_2$ was prepared under the same conditions as above, and the electric resistance thereof was measured. The measurement revealed the film to be an insulating film having a surface resistance of 10 MΩ/sq or more and a volume resistivity of $8\times10$ Ω·cm or more. Further, a refractive index was measured by an ellipsometer (Mizoziri Co., Ltd.). The measurement revealed the film to be a high refractive film having an index of refraction of 2.0 at 830 nm wavelength.

TABLE 2

| | C/N ratio | |
| --- | --- | --- |
| | Before Standing | After Standing |
| Example 3 | 51 dB | 50 dB |
| Comparative Example 3 | 51 dB | 44 dB |

As apparent from Table 2, the C/N ratio does not change even after standing for 500 hours in Example 3, but the C/N ratio decreases from 51 dB to 44 dB in Comparative Example 2.

A change in the appearance did not occur in Example 3, but wrinkles, presumably due to the corrosion deterioration, were numerous in Comparative Example 2. Higher power of laser diode than in Example 1 appears to result from a lower refractive index of the SnOx layer than $In_2O_3$ layer.

EXAMPLE 4

(Ti-recording Medium)

Figure 4A:
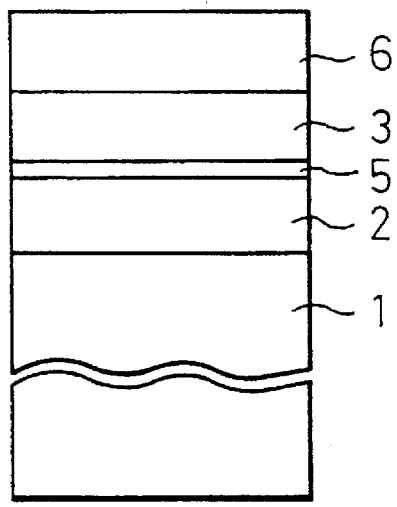
Figure 4B:
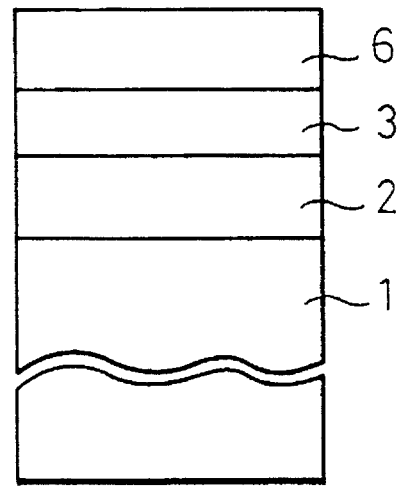

A magneto-optical recording medium having a layer structure as shown in FIG. 4 (A), i.e., the successively superimposed, substrate 1, dielectric layer 2, first protecting layer (Ti film) 5, recording layer 3, and second protecting layer 6, was produced as follows.

A substrate having an area of 20×20 mm and a thickness of 1.2 mm, was prepared of acrylic resin.

The substrate 1 was fixed in the vacuum chamber of an electron-beam evaporation unit (EVD-500 type manufactured by Anerva Co., Ltd.). The vacuum chamber was evacuated to a pressure of $4\times10^{-7}$ Torr or less. Note, the unit was equipped with two evaporation sources, to enable binary evaporation, and six kinds of materials were set on each evaporation source, in such a manner that they could be successively substituted for one another, to provide a continuous evaporation while maintaining the vacuum. In the present example, ZnS, Ti, and FeCo alloy was set on one of the evaporation sources, and Tb was set on the other evaporation source. The layer structure was prepared as follows while maintaining the vacuum.

First, to form the insulating layer 2, the ZnS evaporation source was irradiated with the electron beam. When the ZnS melted, the vaporization was initiated, and simultaneously, the electron beam was adjusted to attain an evaporation speed of approximately 5 Å/sec. After one minute, the shutter was opened to deposit the ZnS on the acrylic substrate 1, and approximately 800 Å thick dielectric layer 2 of ZnS was formed.

Next, to form the first protecting layer 5 on the dielectric layer 2 of ZnS, the evaporation source was substituted for the Ti, and Ti was deposited under the same conditions as above at a deposition speed of approximately 0.5 Å/sec to form the first protecting layer 5 consisting of an approximately 10 Å thick Ti film.

Subsequently, to form the magnetooptical recording layer consisting of FeTbCo as the recording layer 3, two evaporation sources were substituted, i.e., the 70% Fe-30%Co alloy, and the Tb, and the binary evaporation was carried out by the same method as above. The deposition speed was adjusted to 3.5 Å/sec for the FeCo alloy and to 3.2 Å/sec for the Tb. The FeTbCo alloy was deposited to a thickness of approximately 1000 Å to form the recording layer 4.

Finally, to form the second protecting layer 6 for protecting the exposed surface of the recording layer 3, one of the evaporation sources was again substituted for Ti, and the second protecting layer 6 was deposited to a thickness of approximately 1000 Å at a depositing speed of approximately 0.5 Å/sec.

The light having a wavelength of 830 nm was incident onto the layer structure from the side of acrylic substrate to measure the reflectivity thereof. The result is shown in Table 3.

The layer structure as described above was allowed to stand in a constant-temperature and humidity condition of 55° C. and an RH of 60% for 1000 hours. Thereafter, the reflectivity at the wavelength of 830 nm was measured by the same method as carried out before the standing in the above condition.

Comparative Example 4

The procedure of Example 4 was repeated except that the first protecting layer consisting of Ti film was not formed. The result is shown in Table 3.

TABLE 3

|  | Before Standing | After Standing |
| --- | --- | --- |
| Example 4 | 61% | 61% |
| Comparative Example 4 | 61% | 54% |

EXAMPLE 5

(Ti-recording Medium)

The procedure of Example 4 was repeated except that the substrate was made of polycarbonate resin (PC); the layer structure was PC/ZnS(800 Å)/Ti(10 Å)/FeTbCo( 1000 Å)/Ti(1000 Å), i.e., the Ti recording medium.

Comparative Example 5

The procedure of Example 5 was repeated except that the layer structure formed was PC/ZnS(800 Å)/FeTbCo( 1000 Å)/Ti(1000 Å). The result is shown in Table 4.

TABLE 4

|  | Before Standing | After Standing |
| --- | --- | --- |
| Example 5 | 51 dB | 50 dB |
| Comparative Example 5 | 51 dB | 47 dB |

EXAMPLE 6

A 1000 Å thick ITO ($In_2O_3$-$SnO_2$) film was formed on a water-cooled, glass substrate by means of a high frequency sputtering method, in which the pressure of an Ar-$O_2$ (20 vol %) gaseous mixture in the vacuum chamber was $1 \times 10^{-2}$ Torr and the target was made of an In-Sn (Sn 5 wt %) alloy. The ITO film had a surface resistance of 100 MΩ/sq or more and was dielectric.

A magneto-optical layer was formed on a polycarbonate substrate 10×20 mm square and 1.2 mm thick by the high frequency sputtering in the argon gas atmosphere, using an $Fe_{69}Co_8Tb_{23}$ alloy.

The above two substrates treated by the high frequency sputtering were dipped in an aqueous solution of NaCl having a concentration of 0.1 mol/l, as electrodes in a opposed position. The current conducting between the electrodes was measured for 120 minutes. The current conduction was slight and the total quantity of electric charge was $1.4 \times 10^{-2}$ Coulomb.

Comparative Example 6

A 1000 Å thick ITO ($In_2O_3$-$SnO_2$) film was formed on a, glass substrate by means of a high frequency sputtering method, in which the pressure of Ar-gas in the vacuum chamber was $1 \times 10^{-2}$ Torr, the target was made of a sintered $In_2O_3$-$SnO_2$ (5% $SnO_2$), and, the substrate temperature was 130° C. The ITO film had a surface resistance of 500 Ω/sq, and was conductive and transparent.

The above substrate treated by the high frequency sputtering and the polycarbonate substrate treated in Example 6 were dipped in an aqueous solution of NaCl having a concentration of 0.1 mol/l, as electrodes in a opposed position. The current conducting between the electrodes was measured for 120 minutes. The current conduction was noticeable and the total quantity of electric charge was 1.3 Coulomb.

From Example 6 and the Comparative Examples, it will be apparent that a local electrochemical cell will be formed at the interface between the FeCoTb film and the conductive ITO film under an extremely humid condition.

EXAMPLE 7

(Dielectric $In_2O_3$ ($SnO_2$ 7 wt %) and Protecting Ti)

The process of Example 2 was repeated except that instead of the $In_2O_3$ film the $In_2O_3$ containing $SnO_2$ was formed by using a target consisting of a $In_2O_3$—7% by weight of $SnO_2$. The obtained layer structure was PC/$In_2O_3$($SnO_2$)/Ti/FeTbCo/Ti.

The same tests as in Example 2 were carried out and the same results as in Example 2 were obtained.

EXAMPLE 8

(Dielectric $In_2O_3$ ($SnO_2$ 30 wt %) and Protecting Ti)

The process of Example 2 was repeated except that instead of the $In_2O_3$ film the $In_2O_3$ containing $SnO_2$ was formed by using a target consisting of a $In_2O_3$—30% by weight of $SnO_2$. The obtained layer structure was PC/$In_2O_3$($SnO_2$)/Ti/FeTbCo/Ti.

The same tests as in Example 2 were carried out and the same results as in Example 2 were obtained.

EXAMPLE 9

(NdDyFeCo)

A substrate in the form of a disc having a diameter of 200 mm, a thickness of 1.2 mm and having grooves at a pitch of 1.6 μm, was made of acrylic resin (PMMA). The substrate is denoted by 1 in FIG. 1.

The substrate 1 was fixed in the vacuum chamber of a high frequency magnetron sputtering device with three targets (SPF-430 type produced by ANELVA Co., Ltd.). The vacuum chamber was evacuated to a pressure of $4 \times 10^{-7}$ Torr or less, and the substrate 1 was rotated at 15 rpm and water-cooled while the sputtering was carried out.

Subsequently, a gaseous mixture of Ar and $O_2$ (20 vol %) was admitted into the vacuum chamber and the flow rate thereof was adjusted to provide a pressure of $1\times10^{-2}$ Torr. The target of the magnetron sputtering device for the indium oxide deposition was an In (indium) disc having a diameter of 100 mm and a thickness of 5 mm. A radio frequency reactive sputtering was carried out at a discharge power of 100 W and a discharge frequency of 13.56 MHz. As a result, an $In_2O_3$ film was deposited as the dielectric layer 2 having a thickness of approximately 800 Å. Subsequently, the target to be sputtered was replaced with the target for depositing the recording layer, i.e., the $Nd_{7.5}Dy_{17.5}Fe_{52.5}Co_{22.5}$ alloy target (number indicates the composition by atomic %), and argon gas (5N) was then admitted into the vacuum chamber. The NdDyFeCo alloy film was deposited under the same discharge conditions as above to a thickness of approximately 1000 Å.

Finally, as the protecting layer 4, the $In_2O_3$ film was deposited in the same way as the dielectric layer 2, to a thickness of approximately 800 Å.

By the procedure as described above a magnetooptical recording medium having a layer structure of PMMA/$In_2O_3$/NdDyFeCo/$In_2O_3$ was obtained. The circumferential part at a point A (FIG. 1(B)) was observed by an optical microscope, and neither defects nor peeling were revealed.

The layer structure as described above was allowed to stand in a constant-temperature and humidity condition of 60° C. and an RH of 90% for 200 hours. Subsequently, the circumferential part at the point A was observed by an optical microscope, and neither defects nor peeling were revealed, thus showing no change from the condition before standing.

The discrete film of $In_2O_3$ was prepared under the same conditions as above, and the electric resistance thereof was measured. The measurement revealed the film to be an insulating film having surface resistance of 10 MΩ/sq or more and a volume resistivity of 8×10 Ω·cm or more.

We claim:

1. A magneto-optical recording medium comprising a transparent substrate made of synthesized resin, a magneto-optical recording layer, and a dielectric layer interposed between said magneto-optical recording layer and said transparent substrate wherein said dielectric layer is a dielectric, transparent, oxide film consisting of $In_2O_3$, up to about 30 weight percent $SnO_2$ based on the weight of said dielectric layer, and any impurities present being Ta, Sb of F, said layer having a volume resistivity of at least $1\times10^{-1}$ Ohm·cm, said medium further comprising a protecting layer having a thickness no greater than 20 angstrome and consisting of a metallic titanium film between said dielectric layer and said magneto-optical recording layer.

2. A magneto-optical recording medium according to claim 1, wherein the content of said $SnO_2$ is 7% by weight or less.

3. A magneto-optical recording medium according to claim 2, wherein the content of said $SnO_2$ is 3% by weight or less.

4. A magneto-optical recording medium according to claim 1, further comprising a protecting layer covering magneto-optical recording layer on its side opposite to the transparent substrate.

5. A magneto-optical recording medium comprising a transparent substrate made of synthesized resin, a magneto-optical recording layer, and a dielectric layer interposed between said magneto-optical recording layer and transparent substrate, wherein said dielectric layer is a dielectric, transparent, oxide film consisting of $In_2O_3$, up to about 30 weight percent $SnO_2$ based on the weight of said dielectric layer, and any impurities present being Ta, Sb or F, said layer having a volume resistivity of at least $1\times10^{-1}$ ohm·cm, further comprising a protecting layer having a thickness no greater than 20 angstrome and consisting of a metallic titanium film between said dielectric layer and said magneto-optical recording layer, and still further comprising a protecting layer covering said magneto-optical recording layer on its side opposite to the transparent substrate.

\* \* \* \* \*